United States Patent
Baeumler et al.

(10) Patent No.: US 9,371,871 B2
(45) Date of Patent: Jun. 21, 2016

(54) FREEWHEEL DEVICE WITH SWITCHABLE FREEWHEEL

(71) Applicant: BorgWarner Inc., Auburn Hills, MI (US)

(72) Inventors: Richard Baeumler, Brunnen (DE); Alexander Moser, Ketsch (DE)

(73) Assignee: BorgWarner Inc., Auburn Hills, MI (US)

(*) Notice: Subject to any disclaimer, the term of this patent is extended or adjusted under 35 U.S.C. 154(b) by 167 days.

(21) Appl. No.: 13/950,542

(22) Filed: Jul. 25, 2013

(65) Prior Publication Data

US 2014/0027233 A1    Jan. 30, 2014

(30) Foreign Application Priority Data

Jul. 30, 2012 (DE) .......................... 10 2012 015 082

(51) Int. Cl.
| | |
|---|---|
| *F16D 41/00* | (2006.01) |
| *F16D 41/067* | (2006.01) |
| *F16D 41/08* | (2006.01) |
| *F16H 3/00* | (2006.01) |

(52) U.S. Cl.
CPC .............. *F16D 41/00* (2013.01); *F16D 41/067* (2013.01); *F16D 41/086* (2013.01); *F16H 3/003* (2013.01); *F16H 3/005* (2013.01)

(58) Field of Classification Search
CPC ................................. F16D 41/00; F16H 3/005
See application file for complete search history.

(56) References Cited

U.S. PATENT DOCUMENTS

| | | | | |
|---|---|---|---|---|
| 5,743,350 | A * | 4/1998 | Yamawaki et al. | 180/444 |
| 6,588,559 | B2 * | 7/2003 | Blair | 192/20 |
| 2011/0183801 | A1 * | 7/2011 | Ando | 475/5 |

* cited by examiner

*Primary Examiner* — Colby M Hansen
(74) *Attorney, Agent, or Firm* — BrooksGroup

(57) ABSTRACT

A freewheel device having a switchable freewheel which may include a first race, a second race, locking elements arranged between the first and second races and a locking element cage for receiving the locking elements. The locking element cage may be rotated relative to the first race to a first rotational position in which the first race is in rotationally entraining connection to the second race via the locking elements and to a second rotational position in which the first race is not in rotationally entraining connection to the second race. The switching device may be formed by a first planetary gear, a second planetary gear and a switching drive.

20 Claims, 3 Drawing Sheets

FREEWHEEL DEVICE WITH SWITCHABLE FREEWHEEL

CROSS-REFERENCE TO RELATED APPLICATIONS

Figure 1:
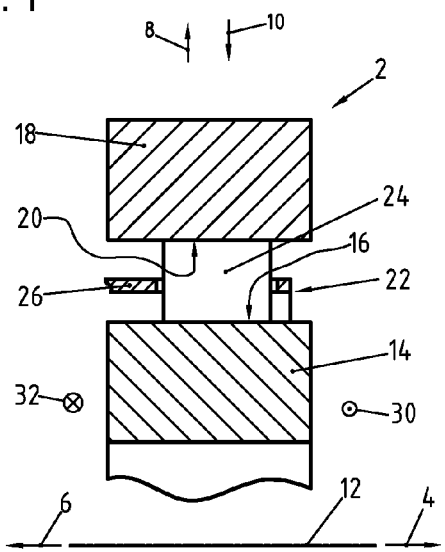

This application claims the benefit of German Patent Application No. 102012015082.2 filed on Jul. 30, 2012.

The disclosure severally relates to a freewheel device having a switchable freewheel with which a switching device is associated.

Freewheel devices having a switchable freewheel, and a switching device for switching the freewheel, are known from practical applications.

The freewheel device may include a switchable freewheel and a switching device for switching the freewheel. The freewheel may include a first race, a second race, locking elements arranged between the first and second races and a locking element cage for receiving the locking elements. The locking element cage may be rotated relative to the first race in order to transfer the freewheel to the respective switching position. The first race may be the drive race or the driven race of the freewheel, while in these cases the second race would form the driven or drive race of the freewheel. In addition, the first race may form an inner or an outer race of the freewheel in relation to the radial direction, while the second race would in these cases correspondingly form the outer or inner race of the freewheel. Furthermore, it is also possible for the first and second races to be arranged one behind the other in the axial direction, the locking elements being interposed. The locking element cage may be rotated by means of the switching device to a first rotational position relative to the first race in which the first race is in rotationally entraining connection to the second race via the locking elements in a first direction of rotation relative to the second race. In addition, the locking element cage can be rotated by the switching device to a second rotational position relative to the first race in which the first race is not in rotationally entraining connection to the second race in the first direction of rotation relative to the second race. For example, the first race may, in the second rotational position of the locking element cage relative to the first race, be in rotationally entraining connection to the second race in a second direction of rotation relative to the second race opposite to the first direction of rotation. Although rotation of the locking element cage relative to the first race is, in general, always referred to here and hereinafter, such reference also includes variations in which the locking element cage may be configured in two or more parts, one part of the locking element cage being rotatable to the respective rotational position relative to the first race while another part of the locking element cage may remain in a predetermined rotational position relative to the first race, as may be the case, for example, with a so-called locking-body freewheel. The switching device may further include a first planetary gear and a second planetary gear. The first planetary gear may include three first components, namely a first sun gear, a first planet gear carrier having at least one planet gear which may be in rotationally entraining engagement with the first sun gear, and a first ring gear or gear wheel which is in rotationally entraining engagement with the at least one planet gear of the first planet gear carrier. If a gear wheel is used instead of the first ring gear, it may be arranged inside the at least one planet gear of the first planet gear carrier in a radial direction. Correspondingly, the second planetary gear may include three second components, namely a second sun gear, a second planet gear carrier having at least one planet gear which may be in rotationally entraining engagement with the second sun gear, and a second ring gear or gear wheel which is in rotationally entraining engagement with the at least one planet gear of the second planet gear carrier. If, in this case also, a second gear wheel is used instead of a second ring gear, it may be arranged radially inside the at least one planet gear of the second planet gear carrier. The first race may be connected non-rotatably to one of the first components while the locking element cage may be connected non-rotatably to one of the second components. Another of the first components may be connected non-rotatably to another of the second components. In other words, the one of the first components which is not connected non-rotatably to the first race may be connected non-rotatably to the one of the second components which is not connected non-rotatably to the locking element cage. Here, the non-rotatable connection of the other of the first components to the other of the second components should preferably not be understood to mean that the other of the first components is non-rotatably connected indirectly, via the components of the first and second planetary gears to be mentioned further hereinafter, to the other of the second components. A further of the first components, that is, the one of the first components which is connected non-rotatably neither to the first race nor to the other of the second components, is associated with a switching drive which serves to drive the further of the first components in order to transfer the switchable freewheel to the respective switching position. Alternatively or additionally, a switching drive which serves to drive the further of the second components may be associated with one of the further of the second components, that is, with the one of the second components which may be connected non-rotatably neither to the locking element cage nor to the other of the first components, in order to transfer the freewheel to the respective switching position. If a switching drive is associated both with the further of the first components and also with the further of the second components, it may be a common switching drive which may have only one drive unit. An association of the switching drive with the further of the first components or/and with the further of the second components should be understood to mean that the further of the first or/and second components can be driven by the switching drive, the drive may not being effected indirectly via the other components of the first or/and second planetary gear mentioned herein.

In order to rotate the locking element cage to the aforementioned first or second rotational position or to each further rotational position relative to the first race, only the further of the first components or/and the further of the second components needs to be rotated with the aid of the switching drive. As a result of the use of a first and second planetary gear, only a small switching force or a small switching moment may be exerted by the switching drive. In other words, practically load-free rotation of the locking element cage to its rotational positions relative to the first race is possible, so that a switching drive with correspondingly low power consumption may be used, and consequently can be of small and space-saving construction. The use of the first and second planetary gears may give rise to a compact structure of the switching device, so that the freewheel device as a whole requires little installation space.

The first and second components which may be connected non-rotatably to one another may be connected non-rotatably to one another in any manner. Thus, the non-rotatable connection may be effected, for example, via intermediate elements or connecting means. In a number of variations the first and second components which may be connected non-rotatably to one another may be formed integrally with one another in order, firstly, to achieve a simple, compact and space-saving structure and, secondly, to simplify manufacture of the freewheel device. The first planet gear carrier may be formed integrally with the second planet gear carrier in order to achieve the non-rotatable connection between the aforementioned first and second components.

The freewheel device, the first planetary gear or the first components, and the second planetary gear or the second components, may be configured in such a way that the switching drive is stationary when the first race and the locking element cage rotate at the same speed.

The first and second components which may be connected non-rotatably to one another or are formed integrally with one another may be formed by different components of the first and second planetary gears. For example, it is possible to connect non-rotatably a sun gear on the one hand to a planet gear carrier on the other, a sun gear on the one hand to a ring gear or gear wheel on the other, or a planet gear carrier on the one hand to a ring gear or gear wheel on the other. The first and second components which may be connected non-rotatably to one another or are formed integrally with one another form the same components in the first and second planetary gears. The first sun gear, for example, may be connected non-rotatably to the second sun gear, the first planet gear carrier to the second planet gear carrier or the first ring gear or gear wheel to the second ring gear or gear wheel. As already indicated, the first planet gear carrier may be connected non-rotatably to the second planet gear carrier. The same components should not necessarily be understood herein to mean that the components are of identical construction; rather, what is decisive is that the same types of components are connected non-rotatably to one another or are formed integrally with one another. In a number of variations the components of the same type which are connected non-rotatably to one another or are formed integrally with one another are also of substantially identical construction, in order significantly to simplify manufacture of the switching device for the freewheel device according to the invention.

The first and second components which may be connected non-rotatably to the first race or to the locking element cage constitute the same components in the first and second planetary gears. The first sun gear, for example, may be connected non-rotatably to the first race and the second sun gear to the locking element cage, the first planet gear carrier may be connected non-rotatably to the first race and the second planet gear carrier to the locking element cage, or the first ring gear or gear wheel may be connected non-rotatably to the first race and the second ring gear or gear wheel to the locking element cage. The same components should be understood to mean components of the same type, although they are not necessarily of identical construction. In a number of variations the components of the same type are also of substantially identical construction, in order to simplify manufacture. In a number of variations the first race may be connected non-rotatably to the first sun gear and the locking element cage to the second sun gear.

In another variation the second or first component of the other planetary gear which resembles the first or second component of the one planetary gear with which the switching drive is associated is of fixed configuration. The sun gear of the one planetary gear, for example, may be associated with the switching drive and the sun gear of the other planetary gear may be of fixed configuration, the planet gear carrier of the one planetary gear may be associated with the switching drive and the planet gear carrier of the other planetary gear may be of fixed configuration, or the ring gear or gear wheel of the one planetary gear may be associated with the switching drive and the ring gear or gear wheel of the other planetary gear may be of fixed configuration. In other words, the same second or first component refers, here again, to a component of the same type, without this necessarily implying an identical construction. With this variation the second or first component of the other planetary gear which resembles the first or second component of the one planetary gear with which the switching drive is associated may be configured to be fixed to the housing. The second or first component of the same type may be fixed to a housing which may be present within a drivetrain, or may even be formed integrally therewith, even though initially separate fabrication and subsequent fixing to the housing.

In another variation, the switching drive may be associated both with the further of the first components and with the further of the second components, those of the first and second components with which the switching drive is associated being drivable by the switching drive while achieving different rotational speeds or/and opposite rotational motions. Freewheel devices in which the switching drive is associated both with the further of the first components and with the further of the second components may have the advantage that a fixed arrangement, or fixing to the housing, of one of the two components mentioned may not be required. With this variation, because of the different rotational speeds or/and the opposite rotational motions, a different rotational speed between the first race and the locking element cage may also be achieved, in order to rotate the locking element cage to the respective rotational position relative to the first race. For this purpose the aforementioned switching drive may have, for example, a first drive unit which may be associated with the first component and a second drive unit which is associated with the second component.

Another variation may include a switching drive comprising only one drive unit which may be associated with both the first and the second component, a first transmission ratio between the switching drive, preferably a drive pinion of the switching drive, and the first component associated with the switching drive deviating from a second transmission ratio between the switching drive, preferably a drive pinion of the switching drive, and the second component associated with the switching drive, in order to achieve the aforementioned different rotational speed between those of the first and second components with which the switching drive is associated. This variation may have the advantage that a switching drive with only one drive unit is required.

In another variation the first and second components with which the switching drive is associated and which are drivable by the switching drive without attaining different rotational speeds but while attaining opposite rotational motions, a first transmission ratio between the switching drive and the first component associated with the switching drive does not deviate from a second transmission ratio between the switching drive and the second component associated with the switching drive. Only opposite rotational motions need to be attained, which preferably is effected via an intermediate part for reversing the direction of rotation, for example an intermediate gear wheel, between the switching drive and the first component associated with the switching drive, or between the switching drive and the second component associated with the switching drive. This variation, too, may have the advantage that a switching drive having only one drive unit is required.

In another variation, the first or/and second component associated with the switching drive is/are formed by the first or/and second ring gear. In this variation, therefore, the switching drive may be arranged in a space-saving manner further out in a radial direction, without the need for a complex and space-intensive mechanism for transmitting the actuating movement of the switching drive to the respective component associated with the switching drive.

In another variation, the switching drive, optionally at least the drive pinion of the switching drive, may be arranged radially outside the first and second planetary gears, in order to achieve a space-saving structure and a short overall axial length of the freewheel device.

In another variation, the planetary gears may be arranged one behind the other in the axial direction. By this means, too, an especially compact structure of the freewheel device may be achieved, wherein the first and second components which are connected non-rotatably to one another or are formed integrally with one another may be coupled directly to one another.

In another variation, the first race is in rotationally entraining connection to the second race in the second rotational position of the locking element cage, and moreover not in a second direction of rotation opposite to the first direction of rotation relative to the second race. In this variation the first race may be therefore in rotationally entraining connection to the second race via the locking elements in the first direction of rotation relative to the second race, while the first race may be completely uncoupled from the second race in the second rotational position of the locking element cage, so that in this variation the second rotational position may also be referred to as the neutral position.

In another variation, the first race may be in rotationally entraining connection to the second race via the locking elements in a second direction of rotation opposite to the first direction of rotation relative to the second race. In other words, in this variation the first race may be brought into rotationally entraining connection to the second race via the locking elements both in the first and in the second direction of rotation relative to the second race. In order to make possible a complete uncoupling of the first and second races in this variation, the locking element cage may also be rotated by means of the switching device to a third rotational position, in which the first race is in rotationally entraining connection to the second race neither in the first direction of rotation nor in the second direction of rotation relative to the second race.

In order to transmit the actuating movement of the switching drive especially simply and without major constructional complexity and cost, in the actuating movement which may be generated directly by the switching drive can be transmitted to the first or/and second component associated with the switching drive solely by means of rotary movements. The actuating movement which may be generated directly by the switching drive may be generated by hydraulic, magnetic, electrical or piezoelectric means. Thus, the actuating movement which may be generated directly by the switching drive may be understood to be, for example, the translational movement of the piston of a switching drive in the form of a piston-cylinder unit or the rotational movement of the output shaft of a switching drive in the form of an electric motor. Although the actuating movement which may be generated directly by the switching drive according to this variation may in principle also be a translational movement, for the sake of a simplified structure of the switching device, if the actuating movement which may be generated directly by the switching drive may also a rotational movement. In another variation, the first race has a running surface which is oriented towards the locking elements and has a shape deviating from a circle. Because of the shape of the running surface which deviates from a circle, a locking gap may be created between the first race on the one hand and the second race on the other, which locking gap narrows in the circumferential direction in order to make possible jamming of the locking elements between the first race on the one hand and the second race on the other, the second race may have for this purpose a running surface oriented towards the locking elements which is circular.

In another variation, the locking elements may be in the form of locking rollers having a circular circumference. It should be mentioned at this point, however, that in principle other locking elements, for example catches or locking bodies with a circumference deviating from a circle may be used; including locking rollers with a circular circumference.

Figure 2:
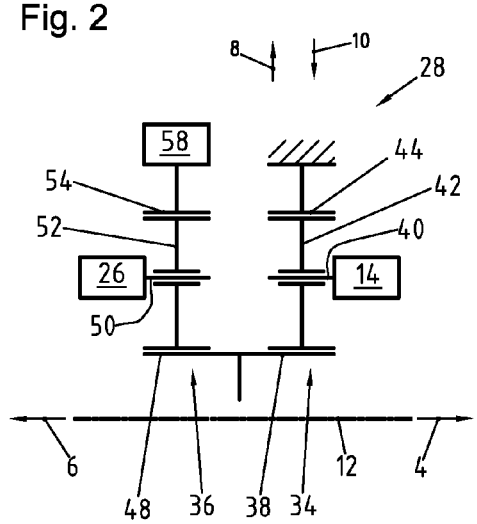
Figure 3:
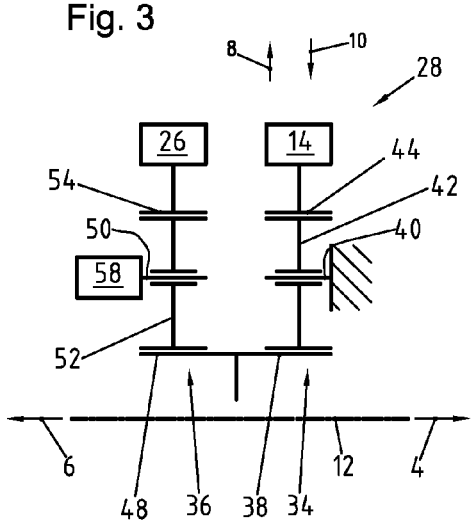
Figure 4:
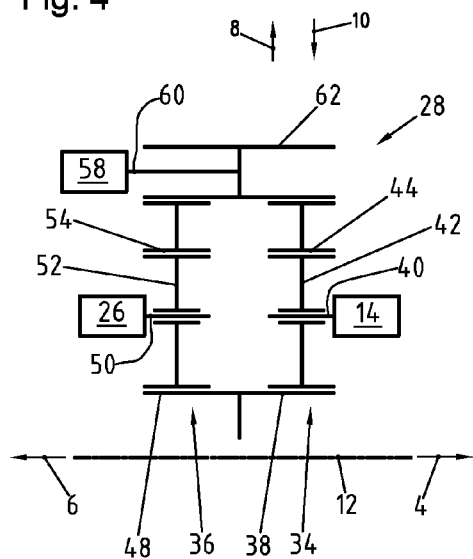
Figure 5:
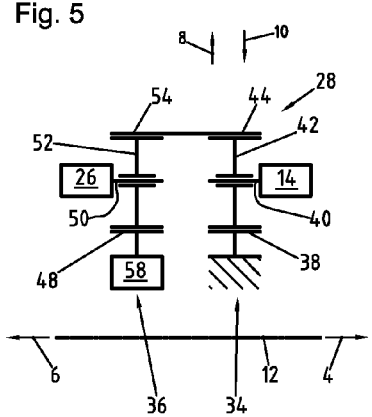
Figure 6:
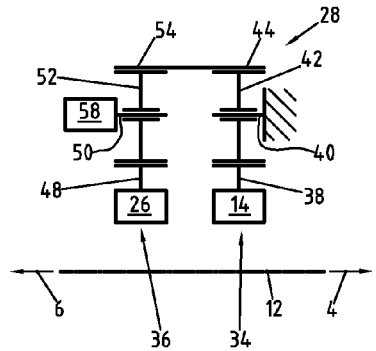
Figure 7:
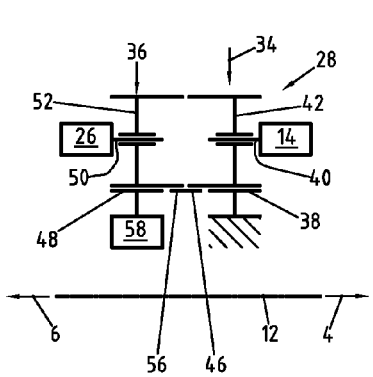
Figure 8:
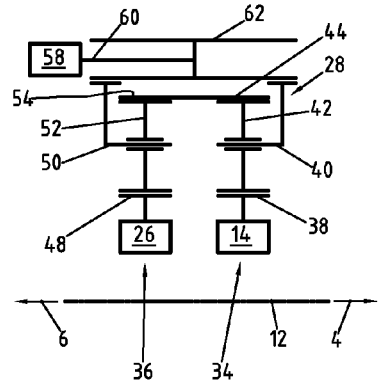
Figure 9:
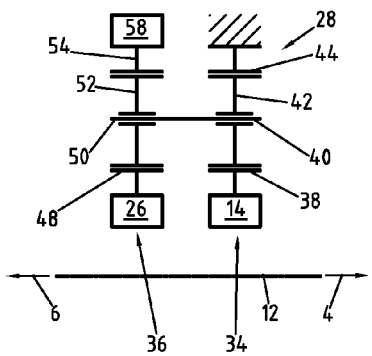
Figure 10:
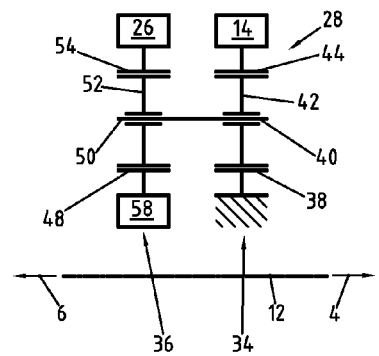
Figure 11:
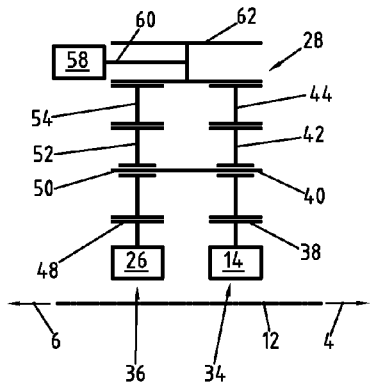
Figure 12:
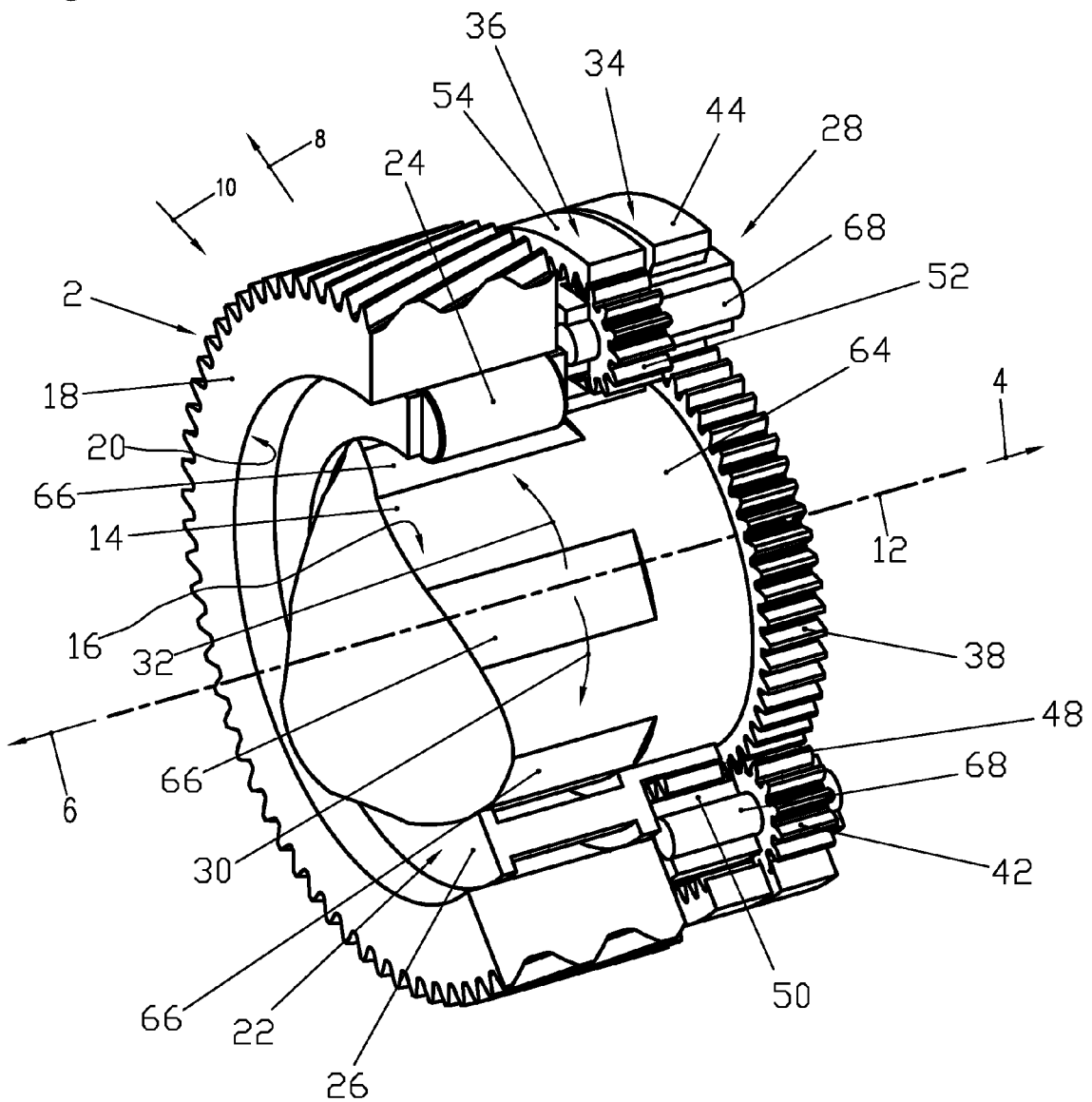

Illustrative variations are explained in more detail below with reference to the appended illustrative drawings, in which:

i. FIG. 1 shows a partial side view of a variation of a switchable freewheel for an embodiment of the freewheel device, ii. FIG. 2 is a schematic representation of a first variation of a switching device for the freewheel according to FIG. 1, iii. FIG. 3 is a schematic representation of a second variation of a switching device for the switchable freewheel according to FIG. 1, iv. FIG. 4 is a schematic representation of a third variation of a switching device for the switchable freewheel according to FIG. 1, v. FIG. 5 is a schematic representation of a fourth variation of a switching device for the freewheel according to FIG. 1, vi. FIG. 6 is a schematic representation of a fifth variation of a switching device for the freewheel according to FIG. 1, vii. FIG. 7 is a schematic representation of a sixth variation of a switching device for the freewheel according to FIG. 1, viii. FIG. 8 is a schematic representation of a seventh variation of a switching device for the freewheel according to FIG. 1, ix. FIG. 9 is a schematic representation of an eighth variation of a switching device for the freewheel according to FIG. 1, x. FIG. 10 is a schematic representation of a ninth variation of a switching device for the freewheel according to FIG. 1, xi. FIG. 11 is a schematic representation of a tenth variation of a switching device for the freewheel according to FIG. 1 and xii. FIG. 12 is a partially cut-away perspective representation of a variation of a freewheel device.

FIG. 1 illustrates a number of variations which may include a switchable freewheel 2 for an embodiment of the freewheel device. The opposite axial directions 4, 6 and the opposite radial directions 8, 10 of the freewheel 2 are indicated by means of corresponding arrows, the axis of rotation 12 of the freewheel 2 extending in the axial directions 4, 6.

The freewheel 2 may include a first race 14 having a running surface 16 oriented outwardly in the radial direction 8. The first race 14 may be in the form of an inner race 14. Viewed in the axial direction 4 or 6, the running surface 16 may have a shape deviating from a circle. In addition, the freewheel 2 may include a second race 18 which may surround the first race 14 on the outside and therefore is in the form of an outer race 18. The second race 18 may have a running surface 20 which is oriented inwardly in the radial direction 10 and which, viewed in the axial direction 4 or 6, may have a circular configuration. A so-called locking gap 22 may be formed in the radial direction 8, 10 between the running surfaces 16 and 20 which face one another. Locking elements 24 of the freewheel 2 may be arranged in the locking gap 22 in the radial direction 8, 10 between the mutually facing running surfaces 16, 20. The locking elements 24 may be in the form of cylindrical locking rollers which may have a circular circumference when viewed in the axial direction 4 or 6, via which circumference the locking rollers may be supported on and may run along the running surface 16 on one side or/and the running surface 20 on the other. The freewheel 2 may further include a locking element cage 26 for receiving the locking elements 24, only one of which is indicated in FIG. 1; the locking elements 24 may each project beyond the locking element cage 26 in the radial directions 8 and 10. The locking element cage 26 may be rotated relative to the first race 14 about the axis of rotation 12.

The locking element cage 26 may be rotated relative to the first race 14 about the axis of rotation 12 with the aid of a switching device 28; the different variations of the switching device 28 will be discussed in more detail later with reference to FIGS. 2 to 11. The locking element cage 26 may be rotated relative to the first race 14 to a first rotational position in which the first race 14 may be in rotationally entraining connection to the second race 18 via the locking elements 24 in a first direction of rotation 30 relative to the second race 18. In addition, the locking element cage 26 may be rotated with the aid of the switching device 28 to a second rotational position relative to the first race 14 in which the first race 14 may not be in rotationally entraining connection to the second race 18 in the first direction of rotation 30 relative to the second race 18. For the operation of the freewheel 2 with the locking element cage 26 in the second rotational position, alternatives are possible and select illustrative examples are briefly sketched below.

In the variation, the first race 14, in the second rotational position of the locking element cage 26, may also not be in rotationally entraining connection to the second race 18 in a second direction of rotation 32 relative to the second race 18 opposite to the first direction of rotation 30. The second rotational position may also be referred to as a neutral position in which the rotational motion of the first race 14 may be completely uncoupled from the rotational motion of the second race 18.

In the second variation, the first race 14, in the second rotational position of the locking element cage 26, may be in rotationally entraining connection to the second race 18 via the locking elements 24 in a second direction of rotation 32 relative to the second race 18 opposite to the first direction of rotation 30. The first and second rotational positions may also be referred to as first and second locking positions of the locking element cage 26, in which the rotational motion of the first race 14 is coupled to the rotational motion of the second race 18 in the respective direction of rotation 30 or 32 relative to the second race 18. The locking element cage 26 may or may not also adopt a neutral position in which the rotational motions of the first race 14 and of the second race 18 are completely uncoupled from one another. The locking element cage 26 may also be rotated by means of the switching device 28 to a third rotational position relative to the first race 14 in which the first race 14 may be in rotationally entraining connection to the second race 18 neither in the first direction of rotation 30 nor in the second direction of rotation 32 relative to the second race 18. The third rotational position of the locking element cage 26 relative to the first race 14 may therefore again be referred to as a neutral position in which the rotational motions of the first race 14 and of the second race 18 are completely uncoupled from one another.

The basic structure of the variations of the switching device 28 represented schematically in FIGS. 2 to 11, which is associated with the freewheel 2 as shown in FIG. 1, will first be discussed below.

The switching device 28 may include a first planetary gear 34 and a second planetary gear 36 which may be arranged one behind the other in the axial direction 4, 6 and therefore in an axially staggered manner. The first planetary gear 34 may include three first components, namely a first sun gear 38, a first planet gear carrier 40 having at least one planet gear 42 which may be in rotationally entraining engagement with the first sun gear 38, and a first ring gear 44 which may be in rotationally entraining engagement with the at least one planet gear 42 of the first planet gear carrier 40. A first gear wheel 46 with external toothing may also be provided; this variant will be explained in more detail later with reference to FIG. 7. In a corresponding manner, the second planetary gear 36 may include three second components, namely a second sun gear 48, a second planet gear carrier 50 having at least one planet gear 52 which may be in rotationally entraining engagement with the second sun gear 48, and a second ring gear 54 which may be in rotationally entraining engagement via its internal toothing with the at least one planet gear 52 of the second planet gear carrier 50. A second gear wheel 56 with external toothing may again be used, as will be discussed in more detail later with reference to FIG. 7.

The switching device 28 may further include a switching drive 58. In a number of variations, the switching device 58 may be formed by a single electric motor. The actuating movement generated directly by the switching drive 58 may be a rotary movement. The actuating movement which may be generated directly by the switching drive 58 in the form of the electric motor should be understood here to possibly include the rotary movement of the output shaft 60, indicated at least in FIGS. 4, 8 and 11, of the switching drive 58 in the form of the electric motor. The output shaft 60 may be in such a case connected non-rotatably to a drive pinion 62. Although the output shaft 60 and the drive pinion 62 are not shown in FIGS. 2, 3, 5, 6, 7, 9 and 10 as a result of the schematic representation, they are nevertheless provided in the variations shown in the figures mentioned.

The first race 14 of the freewheel 2 may be connected or coupled non-rotatably to one of the first components of the first planetary gear 34. However, the connection or coupling is not effected via one of the others of the first components. The first race 14 may be formed integrally with the aforementioned first component of the first planetary gear 34. Thus, in variations illustrated by FIGS. 6, 8, 9 and 11 the first race 14 may be connected non-rotatably to the first sun gear 38, according to FIGS. 2, 4, 5 and 7 it may be connected non-rotatably to the first planet gear carrier 40, and according to FIGS. 3 and 10 it is connected non-rotatably to the first ring gear 44.

One of the second components of the second planetary gear 36 may be connected or coupled non-rotatably to the locking element cage 26, this connection or coupling also may not be effected via the other second components of the second planetary gear 36. In this case, too, the aforementioned second component may be optionally formed integrally with the locking element cage 26. Thus, in the variations illustrated by FIGS. 6, 8, 9 and 11 the locking element cage 26 may be connected non-rotatably to the second sun gear 48, according to FIGS. 2, 4, 5 and 7 it may be connected non-rotatably to the second planet gear carrier 50 and according to FIGS. 3 and 10 it may be connected non-rotatably to the second ring gear 54.

The first component connected non-rotatably to the first race 14 and the second component connected non-rotatably to the locking element cage 26 may be of like construction. In relation to the variations illustrated by FIGS. 2 to 11, the first race 14 may be connected non-rotatably to the first sun gear 38 and the locking element cage 26 may be connected non-rotatably to the second sun gear 48, as is apparent from FIGS. 6, 8, 9 and 11, that the first race 14 may be connected non-rotatably to the first planet gear carrier 40 and the locking element cage 26 may be connected non-rotatably to the second planet gear carrier 50, as is apparent from FIGS. 2, 4, 5 and 7, or that the first race 14 may be connected non-rotatably to the first ring gear 44 and the locking element cage 26 may be connected non-rotatably to the second ring gear 54, as is apparent from FIGS. 3 and 10. It should be pointed out at this point, however, that the first race 14 may be connected non-rotatably to the first sun gear 38 and the locking element cage 26 may be connected non-rotatably to the second sun gear 48, as shown in FIGS. 6, 8, 9 and 11, and a compact and simple structure may thereby be achieved; the variation according to FIG. 9 will be described in more detail later with reference to FIG. 12.

In a number of variations the first and second components of the same type are not only of the same type but are also essentially identical in construction or are configured as identical parts. Thus, the first and second sun gears 38, 48, the planet gears 42, 52 of the first and second planet gear carriers 40, 50 or/and the first and second ring gears 44, 54 may have at least the same dimensions or/and the same number of teeth, in order to simplify manufacture and assembly of the switching device 28 of the freewheel device.

Another of the first components of the first planetary gear 34, that is, one of the first components which is not connected non-rotatably to the first race 14, may be connected non-rotatably to, and may be formed integrally with, another of the second components of the second planetary gear 36, that is, to/with one of the second components which may not be connected non-rotatably to the locking element cage 26. Here too, those of the first and second components which may be connected non-rotatably to one another or are formed integrally with one another may be of the same type, that is, they constitute the same components in the first and second planetary gears 34, 36. Thus, according to the variations illustrated by FIGS. 2 to 4 the first sun gear 38 may be connected non-rotatably to or formed integrally with the second sun gear 48, according to FIGS. 5, 6 and 8 the first ring gear 44 may be connected non-rotatably or formed integrally with the second ring gear 54, according to FIG. 7 the first gear wheel 46 may be connected non-rotatably to or formed integrally with the second gear wheel 56 and according to FIGS. 9 to 11 the first planet gear carrier 40 is connected non-rotatably to or formed integrally with the second planet gear carrier 50.

The aforementioned switching drive 58, or its drive pinion 62, may be associated with a further of the first components or/and with a further of the second components. A further of the first components should be understood here to mean the one of the first components which is connected non-rotatably neither to the first race 14 nor to one of the second components. Correspondingly, a further of the second components should be understood to mean the one of the second components which is connected non-rotatably neither to the locking element cage 26 nor to one of the first components. This variant may include essentially the three alternative embodiments which are described in more detail below.

In the first alternative embodiment the switching drive 58 may be associated only with a further of the first components but not with a further of the second components. Although this first alternative embodiment is not shown in FIGS. 2 to 11 it is nevertheless possible and in some cases advantageous.

In the second alternative variation the switching drive 58 may be associated with a further of the second components but not with a further of the first components. Thus, the switching drive 58 may be associated, for example, with the second sun gear 48, as shown in FIGS. 5, 7 and 10, with the second planet gear carrier 50, as shown in FIG. 6, or with the second ring gear 54, as shown in FIGS. 2 and 9, in order to drive the respective second component 48, 50 or 54.

In some of the afore-described first and second alternative variations the second or first component of the other planetary gear 36; 34 resembling the first or second component of the one planetary gear 34; 36, which may be associated with the switching drive 58, may be configured to be fixed, and may be fixed to the housing, as is shown in FIGS. 2, 3, 5 to 7 and 9 and 10.

In some of the aforementioned third alternative variation the switching drive 58 may be associated both with a further of the first components and also with a further of the second components, as shown in FIGS. 4, 8 and 11. As already indicated, the switching device 28 comprises a switching drive 58 having only one drive unit in the form of an electric motor with a drive pinion 62. Thus, in the variations illustrated by FIGS. 4 and 11, the drive pinion 62 of the switching drive 58 drives both the first ring gear 44 and the second ring gear 54, the drive pinion 62 and may engage for this purpose in an additional, external toothing on the first and second ring gears 44, 54. In this way the switching drive 58 or the drive pinion 62 may be provided further out in the radial direction 8, thereby shortening the overall length of the switching device 28 in the axial direction 4, 6. Alternatively, however, it is also possible that the drive pinion 62 may engage in the internal toothing, of the first and second ring gears 44, 54. In the variation illustrated by FIG. 8, the drive pinion 62 may engage in a toothing, and may be an external toothing, on the first and second planet gear carriers 40, 50 in order to effect a drive of the aforementioned first and second components. In deviation from the variations mentioned, in the third alternative the switching drive 58 may also include two mutually independent drive units or electric motors, one of which is associated with the first component while the other is associated with the second component. However, the first and second components, in the third alternative variation, have a switching drive 58 with only one, common drive unit. In variations in the third alternative is that a fixed configuration, or a configuration fixed to the housing, of the first and second components associated with the switching drive 58 is not required, whereby manufacture and assembly can be significantly simplified.

In the case of the third alternative variation, the locking element cage 26 may be rotated relative to the first race 14, those of the first and second components with which the switching drive 58 with a common drive unit is associated may be driven by the switching drive 58 while attaining different rotational speeds. For this purpose a first transmission ratio between the switching drive 58 or the drive pinion 62 and the first component associated with the switching drive 58 may deviate from a second transmission ratio between the switching drive 58 or the drive pinion 62 and the second component associated with the switching drive 58. In relation to the variations illustrated by FIGS. 4 and 11, this means that the first transmission ratio between the drive pinion 62 and the first ring gear 44 may deviate from the second transmission ratio between the drive pinion 62 and the second ring gear 54, in order to achieve different rotational speeds between the first and second ring gears 44, 54 despite the uniform rotational speed of the drive pinion 62. In relation to the variation illustrated by FIG. 8, this means that the first transmission ratio between the drive pinion 62 and the first planet gear carrier 40 may deviate from the second transmission ratio between the drive pinion 62 and the second planet gear carrier 50, in order to achieve different rotational speeds between the first and second planet gear carriers 40, 50 despite the uniform rotational speed of the drive pinion 62.

The different transmission ratio may be achieved, for example, by means of a number of teeth of the external toothing on the first ring gear 44 or on the first planet gear carrier 40 which differs from the number of teeth of the external toothing on the second ring gear 54 or on the second planet gear carrier 50. However, in order to provide substantially identical first and second ring gears 44, 54, and first and second planet gear carriers 40, 50, which simplify manufacture and assembly, the drive pinion 62 may have a first section associated with the first component and having a first number of teeth, and a second section associated with the second component and having a second number of teeth, the first number of teeth deviating from the second number of teeth. In this case the corresponding external toothing on the first and second components may have substantially the same configuration.

Alternatively or additionally, to the different rotational speeds and transmission ratios in the variations illustrated by FIGS. 4, 8 and 11, those of the first and second components with which the switching drive 58 may be associated may be drivable by the switching drive 58 so as to attain opposite rotary movements. In order to achieve opposite rotary movements, an intermediate part (not shown) for reversing the direction of rotation, for example an intermediate gear wheel, may be arranged between the switching drive 58 or the drive pinion 62 and the first component associated with the switching drive 58, or between the switching drive 58 or the drive pinion 62 and the second component associated with the switching drive 58.

In order to provide a switching device 28 with a short axial overall length, the switching drive 58, optionally at least the drive pinion 62 of the switching drive 58, may be arranged outside the first and second planetary gears 34, 36 in the radial direction 8, as is the case in the variations illustrated by FIGS. 2, 4, 9 and 11. In order to implement this without major constructional complexity and cost, and in a space-saving manner, the first or/and second component associated with the switching drive 58 may be formed by the first or/and second ring gear 44, 54, for example as illustrated in FIGS. 2, 4, 9, and 11.

In the variations illustrated in FIG. 7, a first and second gear wheel 46, 56 with external toothing, which may be connected non-rotatably to one another and for this purpose may be formed integrally with one another, may be used instead of the first and second ring gears 44, 54 with internal toothing. The first and second gear wheels 46, 56 may be in this case arranged inside the planet gears 42, 52 in the radial direction 10 and coaxially with the sun gears. The switching device 28 in combination with the freewheel 2 of FIG. 1, the first and second planetary gears 34, 36 may be configured and adapted to one another in such a way that the switching drive 58 is stationary when the first race 14 and the locking element cage 26 rotate at the same rotational speed about the axis of rotation 12. The first and second planetary gears 34, 36 may be also of substantially identical construction in order to simplify assembly and manufacture. Thus, the first and second sun gears 38, 48 may be of identical configuration at least with regard to diameter and external toothing, the planet gears 42, 52 may be of identical configuration at least with regard to their diameter and external toothing or/and the first and second ring gears/gear wheels 44, 54; 46, 56 may be of identical configuration at least with regard to their diameter and internal/external toothing. It is also apparent from the preceding description that the actuating movement which may be generated directly by the switching drive 58, which may be a rotary movement, may be transmissible or may be transmitted to the first or/and second component associated with the switching drive 58 solely via rotary movements.

FIG. 12 shows a variation of the freewheel device which corresponds substantially to the variation illustrated by FIG. 9 in combination with FIG. 1, so that the preceding description of the variation in FIG. 9 in combination with FIG. 1 applies correspondingly to the variation in FIG. 12, like or similar components being designated by the same reference numerals in FIG. 12. In addition, the following discussion will relate essentially to the further features according to the variation of FIG. 12.

As can be seen from FIG. 12, the first and second planetary gears 34, 36 may be arranged behind the freewheel 2 in the axial direction 4, so that one may also speak of an axially staggered arrangement of freewheel 2 and planetary gears 34, 36. In this case the second planetary gear 36 may be arranged between the first planetary gear 34 and the freewheel 2 in the axial direction 4, 6. In principle the freewheel 2 may also be arranged between the first planetary gear 34 and the second planetary gear 36 in the axial direction 4, 6. A shaft 64, which may be configured as a solid shaft, a hollow shaft or an at least partially hollow solid shaft, may be provided on the inside in the radial direction 10. The first sun gear 38 of the first planetary gear 34 may be formed in one piece with the shaft 64. Starting from the section with the first sun gear 38, the shaft 64 extends in the axial direction 6 in the direction of the freewheel 2 through the second sun gear 48 of the second planetary gear 36 and may then be configured integrally with the inner, first race 14 of the freewheel 2. In other words, the section of the shaft 64 projecting in the axial direction 6 beyond the second sun gear 48 of the second planetary gear 36 may form the first race 14, while the side of this section facing outwards in the radial direction 8 forms the running surface 16 of the race 14 against which the locking elements 24 in the form of locking rollers may be supported and along which they can run. In order to achieve the shape of the running surface 16 deviating from a circle in this case, the shaft 64, which otherwise may have a circular circumference, may have flattened portions 66 spaced uniformly from one another in the circumferential direction and which may have been produced, for example, by suitable removal of material by milling or the like and are each associated with a respective one of the locking elements 24. It should therefore be noted in the first place that the first sun gear 38 and the first race 14 may be formed integrally with one another as part of the shaft 64.

The second sun gear 48 of the second planetary gear 36 may have a number of teeth which corresponds to the number of teeth of the first sun gear 38 of the first planetary gear 34. The second sun gear 48 may be of substantially tubular configuration and may extend in the axial direction 6 to the freewheel 2 where the second sun gear 48 merges integrally with the locking element cage 26 in the locking gap 22 of the freewheel 2. In this case the locking element cage 26 may be of substantially tubular configuration, the locking elements being arranged in corresponding openings within the tubular locking element cage 26.

The first and second planet gear carriers 40, 50 may also be connected integrally to one another, the composite element formed by the two planet gear carriers 40, 50 may be of substantially tubular configuration. Fixed spindles 68, on which the planet gears 42, 52 may be mounted rotatably, extend in the axial direction 4, 6 inside the wall of the two planet gear carriers 40, 50. The planet gears 42, 52 may in turn be arranged in corresponding openings of the wall of the tubular planet gear carriers 40, 50. However, the planet gears 42 may not be arranged on the same spindle 68 as the planet gears 52; a planet gear 42 and a planet gear 52 may be arranged alternately in the circumferential direction on successive spindles 68. The planet gears 42 and 52 may be of identical configuration or are identical parts.

The first ring gear 44 and the second ring gear 54 may again be of tubular configuration with an internal toothing oriented inwardly in the radial direction 10, the internal toothings being of identical configuration. Although it is not represented here, an external toothing in which the afore-described drive pinion 62 (not shown here) of the switching drive 58 may engage should also be formed on the side of the second ring gear 54 oriented outwardly in the radial direction 8. The first ring gear 44 may be fastened to a stationary housing and may therefore itself be configured to be stationary or fixed to the housing. Here, it may be advantageous if the first ring gear 44 has initially been produced separately in order to be fastened subsequently to the housing, although a first ring gear 44 configured integrally with the housing is also possible. A representation of the housing has been omitted from FIG. 12 for reasons of clarity.

It can also be seen from FIG. 12 that the first and second sun gears 38, 48, the first and second planet gear carriers 40, 50 and the first and second ring gears 44, 54 may be arranged in alignment with one another in the axial direction 4, 6 in order to achieve a compact structure. In addition, the outer, second race 18 may have on its outwardly facing side in the radial direction 8 an external toothing in order to be able to function as an input or output drive side of the freewheel 2.

LIST OF REFERENCES

2 Freewheel
4 Axial direction
6 Axial direction
8 Radial direction
10 Radial direction
12 Axis of rotation
14 First race
16 Running surface
18 Second race
20 Running surface
22 Locking gap
24 Locking elements
26 Locking element cage
28 Switching device
30 First direction of rotation
32 Second direction of rotation
34 First planetary gear
36 Second planetary gear
38 First sun gear
40 First planet gear carrier
42 Planet gear
22 First ring gear
46 First gear wheel
48 Second sun gear
50 Second planet gear carrier
52 Planet gear
54 Second ring gear
56 Second gear wheel
58 Switching drive
60 Output shaft
62 Drive pinion
64 Shaft
66 Flattened portions
68 Spindles

What is claimed is:

1. A freewheel device, comprising:
a switchable freewheel having a first race, a second race, locking elements arranged between the first and second races and a locking element cage for receiving the locking elements, which locking element cage is rotated relative to the first race, and a switching device by means of which the locking element cage is rotated to a first rotational position relative to the first race in which the first race is in rotationally entraining connection to the second race via the locking elements in a first direction of rotation relative to the second race, and to a second rotational position relative to the first race in which the first race is not in rotationally entraining connection to the second race in the first direction of rotation relative to the second race, wherein the switching device comprises a first planetary gear having three first components, being a first sun gear, a first planet gear carrier with at least one planet gear which is in rotationally entraining engagement with the first sun gear, and a first ring gear or gear wheel which is in rotationally entraining engagement with the at least one planet gear of the first planet gear carrier, and a second planetary gear having three second components, being a second sun gear, a second planet gear carrier with at least one planet gear which is in rotationally entraining engagement with the second sun gear, and a second ring gear or gear wheel which is in rotationally entraining engagement with the at least one planet gear of the second planet gear carrier, wherein the first race is connected non-rotatably to one of the first components and the locking element cage to one of the second components, another of the first components is connected non-rotatably to another of the second components, and a switching drive is engaged with a further of the first components or with a further of the second components.

2. The freewheel device as in claim 1, wherein the first and second planetary gears are configured such that the switching drive is stationary when the first race and the locking element cage rotate at the same speed.

3. The freewheel device as in claim 1, wherein those of the first and second components which are connected non-rotatably to one another or are formed integrally with one another form the same components in the first and second planetary gears.

4. The freewheel device as in claim 1, wherein the first and second components which are connected non-rotatably to the first race or to the locking element cage form the same components in the first and second planetary gears.

5. The freewheel device as in claim 1, wherein the first or second component of the other planetary gear resembling the first or second component of the one planetary gear with which the switching drive is engaged is configured to be stationary.

6. The freewheel device as in claim 1, wherein those of the first and second components with which the switching drive is associated can be driven by the switching drive while attaining different rotational speeds or/and opposite rotational motions to one another.

7. The freewheel device as in claim 6, wherein a first transmission ratio between the switching drive and the first component associated with the switching drive deviates from a second transmission ratio between the switching drive and the second component associated with the switching drive.

8. The freewheel device as in claim 1, wherein the first or second component associated engaged with the switching drive is formed by the first or second ring gear.

9. The freewheel device as in claim 1, wherein the switching drive is arranged radially outside the first and second planetary gears.

10. The freewheel device as in claim 1, wherein, in the second rotational position of the locking element cage, the first race also is not in rotationally entraining connection to the second race in a second direction of rotation opposite to the first direction of rotation relative to the second race, or in that, in the second rotational position of the locking element cage, the first race is in rotationally entraining connection to the second race via the locking elements in a second direction of rotation opposite to the first direction of rotation relative to the second race, the locking element cage being rotatable by means of the switching device to a third rotational position in which the first race is in rotationally entraining connection to the second race neither in the first direction of rotation nor in the second direction of rotation relative to the second race.

11. The freewheel device as in claim 1, wherein an actuating movement generated directly by the switching drive is transmitted to the first or second component engaged with the switching drive solely by means of rotary movements, the actuating movement being generated directly by the switching drive.

12. The freewheel device as in claim 1, wherein the first race has a running surface facing towards the locking elements which has a shape deviating from a circle, and the locking elements are in the form of locking rollers with a circular circumference.

13. The freewheel device as in claim 12 where in the running surface has flattened portions spaced uniformly around the first race.

14. A freewheel device comprising:
a switchable freewheel having a first race, a second race, locking elements arranged between the first and second races and a locking element cage receiving the locking elements, and a switching device rotating the locking element cage to lock or unlock the locking elements between the first and second races, wherein the switching device comprises a first planetary gear comprising a first sun gear, first planet gears with a first carrier, and a first ring gear, and a second planetary gear comprising a second sun gear, second planet gears with a second carrier, and a second ring gear, wherein the first race is connected non-rotatably to one of the first sun gear, the first carrier, or the first ring gear, and the locking element cage is connected to one of the second sun gear, the second carrier, or the second ring gear, and another of the first sun gear, the first carrier, or the first ring gear is connected non-rotatably to another of the second sun gear, the second carrier, or the second ring gear, and a switching drive is engaged with one of the first sun gear, first carrier, first ring gear, second sun gear, second carrier, or second ring gear.

15. The freewheel device as in claim 14 wherein the switching device is an electric motor and is engaged with the second sun gear.

16. The freewheel device as in claim 14 wherein the locking element cage is integrally formed with the second sun gear.

17. The freewheel device as in claim 14 wherein the second race is a drive pinion with an outer surface that is a gear.

18. The freewheel device as in claim 14 wherein the inner race is integrally formed with the first sun gear.

19. The freewheel device as in claim 18 further comprising a shaft wherein the inner race is part of the shaft, and the shaft extends in order through the locking element cage, the second planetary gear, and the first planetary gear.

20. A freewheel device comprising:
a shaft, a first race formed on the shaft, a second race extending around the first race, locking elements arranged between the first and second races, a locking element cage receiving the locking elements, and a switching device rotating the locking element cage to lock or unlock the locking elements between the first and second races, wherein the switching device comprises a first planetary gear comprising a first sun gear, first planet gears with a first carrier, and a first ring gear, a second planetary gear comprising a second sun gear, second planet gears with a second carrier, and a second ring gear, wherein the first race is connected non-rotatably to one of the first sun gear, the first carrier, or the first ring gear, and the locking element cage is connected to one of the second sun gear, the second carrier, or the second ring gear, and another of the first sun gear, the first carrier, or the first ring gear is connected non-rotatably to another of the second sun gear, the second carrier, or the second ring gear and a switching drive engaged with one of the first sun gear, first carrier, first ring gear, second sun gear, second carrier, or second ring gear wherein the inner race is part of the shaft, and the shaft extends in order through the locking element cage, the second planetary gear, and the first planetary gear.

* * * * *